United States Patent
Hasler (10) Patent No.: US 9,696,185 B2
(45) Date of Patent: Jul. 4, 2017

(54) 6D POSITIONING SYSTEM USING A SHADOW SENSOR

(71) Applicant: CSEM Centre Suisse d'Electronique et de Microtechnique SA—Recherche et Développement, Neuchâtel (CH)

(72) Inventor: David Hasler, Neuchâtel (CH)

(73) Assignee: CSM CENTRE SUISSE D'ELECTRONIQUE ET DE MICROTECHNIQUE SA—RECHERCHE ET DÉVELOPPEMENT, Neuchâtel (CH)

( * ) Notice: Subject to any disclaimer, the term of this patent is extended or adjusted under 35 U.S.C. 154(b) by 352 days.

(21) Appl. No.: 14/597,434

(22) Filed: Jan. 15, 2015

(65) Prior Publication Data

US 2016/0209248 A1    Jul. 21, 2016

(51) Int. Cl.
G01D 5/36     (2006.01)
G01S 3/783    (2006.01)
G01S 5/16     (2006.01)

(52) U.S. Cl.
CPC ............. *G01D 5/36* (2013.01); *G01S 3/7835* (2013.01); *G01S 5/16* (2013.01)

(58) Field of Classification Search
CPC ............ G01D 5/36; G01S 5/16; G01S 3/7835
USPC ........................................................ 250/206
See application file for complete search history.

(56) References Cited

U.S. PATENT DOCUMENTS

| | | | |
|---|---|---|---|
| 6,333,733 B1 * | 12/2001 | Andersson | G06F 3/0338 345/157 |
| 6,417,836 B1 | 7/2002 | Kumar et al. | |
| 6,978,167 B2 | 12/2005 | Dekel et al. | |
| 7,652,259 B2 * | 1/2010 | Kimchy | A61B 1/05 250/370.08 |
| 7,768,498 B2 | 8/2010 | Wey | |
| 7,876,942 B2 | 1/2011 | Gilboa | |
| 8,368,647 B2 | 2/2013 | Lin | |
| 8,885,177 B2 | 11/2014 | Ben-Yishai et al. | |
| 2013/0106833 A1 | 5/2013 | Fun | |
| 2013/0120763 A1 | 5/2013 | Grenet et al. | |

OTHER PUBLICATIONS

Edo. Franzi: "Vision embedded Systems—CSEM, SpaceCoder Technology", Jun. 26, 2013, XP055268290, Retrieved from the Internet: URL http://www.swissmntnetwork.ch/content/wp-content/uploads/2016/06/SpaceCoder1.pdf (retrieved on Apr. 25, 2016).

(Continued)

*Primary Examiner* — Seung C Sohn
(74) *Attorney, Agent, or Firm* — Pearne & Gordon LLP (57) ABSTRACT

A positioning system, in particular, positioning in six dimensions of a sensor with respect to an assembly composed of a multitude of LEDs, is provided. The sensor is a shadow sensor and has a mask and a 2D imager. By recording the shadow of the mask cast by each LED on the imager, and by properly multiplexing the LEDs, the system can compute the 6D position of the LED assembly with respect to the shadow sensor. This computation is based, in part, on treating the shadow of the mask cast on the imager as the equivalent of the projection of light in a pinhole camera.

22 Claims, 7 Drawing Sheets

(56) References Cited

OTHER PUBLICATIONS

R. Hartley and A. Zisserman, Multiple view geometry in computer vision, second edition, Cambridge university press, ISBN 0521 54051.

Haralick, Bert M., Chung-Nan Lee, Karsten Ottenberg, and Michael Nölle. "Review and Analysis of Solutions of the Three Point Perspective Pose Estimation Problem." International Journal of Computer Vision 13, No. 3 (1994): 331-56.

A. Chebira, E. Grenet, P-A. Beuchat, A. Corbaz, E. Franzi, D. Hasler, and P. Masa. "Nanotracking for image-guided microsurgery", Swiss Center for Electronics and Microtechnology (CSEM), Neuchâtel, Switzerland, HearRestore, RTD 2013.

* cited by examiner

6D POSITIONING SYSTEM USING A SHADOW SENSOR

BACKGROUND OF THE INVENTION

1. Field of the Invention

The present disclosure relates to a positioning system, in particular, a compact positioning system in six dimensions of a sensor with respect to an assembly composed of a plurality of light sources.

2. Description of Related Art

In traditional positioning systems for three to six dimensional measurements (X, Y, Z, pitch, roll, and yaw), a camera records the position of a set of points in the scene. These points can appear in the form of a predefined shape, like a cross or a small ball whose center is the computed using conventional image processing techniques. Other alternatives use point light sources instead of objects with a given shape. The common paradigm to these systems is that they employ a large camera or stereo-camera system (e.g. on the order of centimeters to meters per dimension). In addition, the camera in these systems is fixed and records the motion of the target, which is composed of a set of the above mentioned points or light sources. In some cases, the camera may be displaced as long as the displacement is accounted for.

BRIEF SUMMARY OF THE INVENTION

Accordingly, a positioning system and method that overcomes the above limitations and deficiencies of the current systems and methods is desired.

According to one example, a six dimensional (6D) positioning system comprises a target comprising at least four light sources; a shadow sensor configured to sense shadows cast on the sensor by light emitted from the at least four light sources of the target; and a processor, wherein the processor is configured to: sync shadow sensing with a pulsing of the at least four light sources of the target; distinguish between the sensed shadows from each of the at least four light sources of the target; determine two dimensional (2D) positions corresponding to each of the at least four light sources of the target based on the sensed shadows; and compute a 6D position of the target with respect to the shadow sensor based on the determined 2D positions.

In various embodiments of the above example, the shadow sensor comprises a mask and an imager, the mask having repetitive elements and a distinctive element, and as light from the at least four light sources of the target passes through the mask, a shadow of the mask is cast on the imager; the distinctive element is embodied as a 2D code; the repetitive element of the mask comprises regular intervals between the repetitive elements; the shadow sensor comprises a plurality of filters for filtering light of a plurality of wavelengths, and the processor is configured to distinguish between the sensed light from each of the at least four light sources based at least in part on the sensed wavelengths of light; the processor is configured to distinguish between the sensed light from each of the at least four light sources based at least in part on temporal modulation of the at least four light sources of the target; the shadow sensor comprises a filter for filtering wavelengths of ambient light; the at least four light sources of the target are light emitting diodes (LEDs); the shadow sensor further comprises a photodiode for syncing shadow sensing with the pulsing of the at least four light sources of the target or for identifying which light source is emitting light; and/or the 6D position of the target with respect to the shadow sensor is computed based on a pinhole model of light projection.

According to another example, a six dimensional (6D) positioning system comprises: a target comprising at least three light sources; at least two shadow sensors configured to sense shadows cast on the at least two shadow sensor sensors by light emitted from the at least three light sources of the target; and a processor, wherein the processor is configured to: sync shadow sensing of the at least two shadow sensors with a pulsing of the at least three light sources of the target; distinguish between the sensed shadows from each of the at least three light sources of the target, for each of the at least two shadow sensors; determine two dimensional (2D) positions corresponding to each of the at least three light sources of the target based on the sensed shadows, for each of the at least two shadow sensors; and compute a 6D position of the target with respect to the at least two shadow sensors based on the determined 2D positions.

In various embodiments of the above example, the shadow sensor comprises a mask and an imager, the mask having repetitive elements, a distinctive element, or a 2D code, and as light from the at least three light sources of the target passes through the mask, a shadow of the mask is cast on the imager; the mask has a 2D code is contained on the mask; the mask has a repetitive element and there is a regular interval between the repetitive elements of the mask; the shadow sensor comprises a plurality of filters for filtering light of a plurality of wavelengths, and the processor is configured to distinguish between the sensed light from each of the at least three light sources based at least in part on the sensed wavelengths of light; the processor is configured to distinguish between the sensed light from each of the at least three light sources based at least in part on temporal modulation of the at least three light sources of the target; the shadow sensor comprises a filter for filtering wavelengths of ambient light; the at least three light sources of the target are light emitting diodes (LEDs); the shadow sensor further comprises a photodiode for syncing shadow sensing of the at least two shadow sensors with the pulsing of the at least three light sources of the target or for identifying which light source is emitting light; and/or the 6D position of the target with respect to the at least two shadow sensors is computed based on a pinhole model of light projection.

According to yet another example, a method for determining a six dimensional (6D) position comprises: recording a projection of at least four points, a projection of a point being a projection of light from a light source on a sensor, wherein the light source and the sensor are part of a positioning system; computing a first estimate of the 6D position using known prior positions or a linear method; virtually reprojecting the at least four points on the sensor using a pinhole model of light projection; and computing an error between the recorded projections and the virtual reprojections.

In various embodiments of the above example, the method the steps of computing an estimate, virtually reprojecting the at least four points, and computing an error are performed iteratively; the positioning system comprises two sensors and three light sources, the light sources being light emitting diodes (LEDs); the positioning system comprises one sensor and four light sources, the light sources being light emitting diodes (LEDs); the sensor is a shadow sensor comprising a mask and an imager, the mask having repetitive elements, a distinctive element, or a 2D code, and wherein as light from the light source passes through the mask, a shadow of the mask is cast on the imager; and/or the shadow sensor further comprises a photodiode for syncing the recording of the projection of the at least four points with an emission of light from the light source or for identifying which light source is emitting light.

According to yet another example, a six dimensional (6D) positioning system comprises: a target comprising three light sources; a shadow sensor configured to sense shadows cast on the sensor by light emitted from the three light sources of the target; and a processor, wherein the processor is configured to: sync shadow sensing with a pulsing of the three light sources of the target; distinguish between the sensed shadows from each of the three light sources of the target; determine two dimensional (2D) positions corresponding to each of the three light sources of the target based on the sensed shadows; determine a Z value for each of the three light sources, the Z value corresponding to a distance from said light source for which the Z value is determined to the shadow sensor as measured along the optical axis of said shadow sensor; and compute a 6D position of the target with respect to the shadow sensor based on the determined 2D positions and on the determined Z values.

In various embodiments of the above example, the processor is further configured to: compute four 6D positions of the target with respect to the shadow sensor based on the determined 2D positions; and select a 6D position among said four 6D positions, the selected 6D position having the most correspondence to said determined Z values.

DETAILED DESCRIPTION OF THE INVENTION

Certain terminology is used herein for convenience only and is not to be taken as a limitation on the present invention. Relative language used herein is best understood with reference to the drawings, in which like numerals are used to identify like or similar items. Further, in the drawings, certain features may be shown in somewhat schematic form.

It is also to be noted that the phrase "at least one of", if used herein, followed by a plurality of members herein means one of the members, or a combination of more than one of the members. For example, the phrase "at least one of a first widget and a second widget" means in the present application: the first widget, the second widget, or the first widget and the second widget. Likewise, "at least one of a first widget, a second widget and a third widget" means in the present application: the first widget, the second widget, the third widget, the first widget and the second widget, the first widget and the third widget, the second widget and the third widget, or the first widget and the second widget and the third widget. Finally, the term "substantially," if used herein, is a term of estimation.

Figure 10:
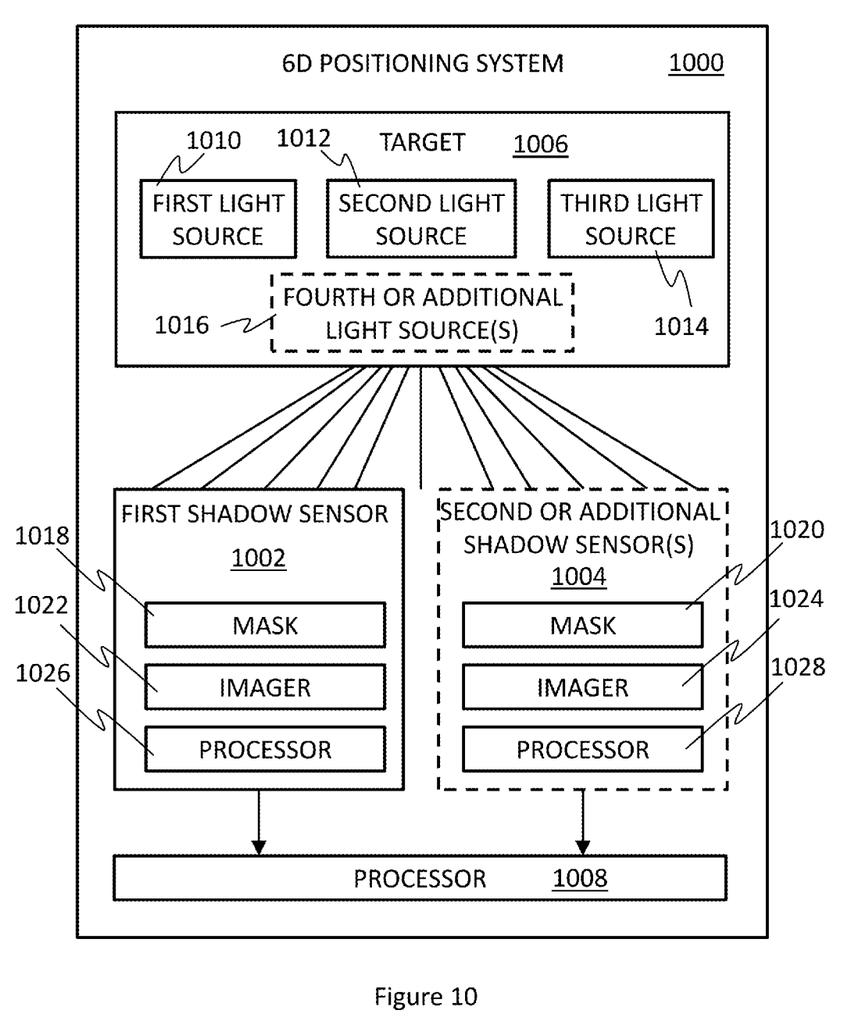
FIG. 10 is a block diagram of a positioning system as described herein.

The present disclosure relates to a compact 6D positioning system 1000. One example of such a system 1000 is illustrated in FIG. 10. Generally, as illustrated in FIG. 10, the positioning system 1000 can be said to include at least one sensor 1002, 1004, a target 1006, and a processor 1008. The sensors 1002, 1004 may be shadow sensors, for example, as described in U.S. patent application Ser. No. 13/810,455 (hereinafter the "'455 Application"), the entirety of which is incorporated herein by reference. As illustrated in FIG. 10 and described in more detail below, each sensor 1002, 1004 may comprise a mask 1018, 1020, an imager 1022, 1024, and a processor 1026, 1028. However, it should be noted that various embodiments of the system 1000 may comprise any combination of processors independent of or dependent of the sensors 1002, 1004. For example, in some embodiments, the system 1000 may comprise only a single independent processor 1008 or may comprise only processors 1026, 1028 in the sensors 1002, 1004. As will also be described in more detail below, the target may comprise at least three light sources 1010-1016, such as light emitting diodes (LEDs).

Figure 1:
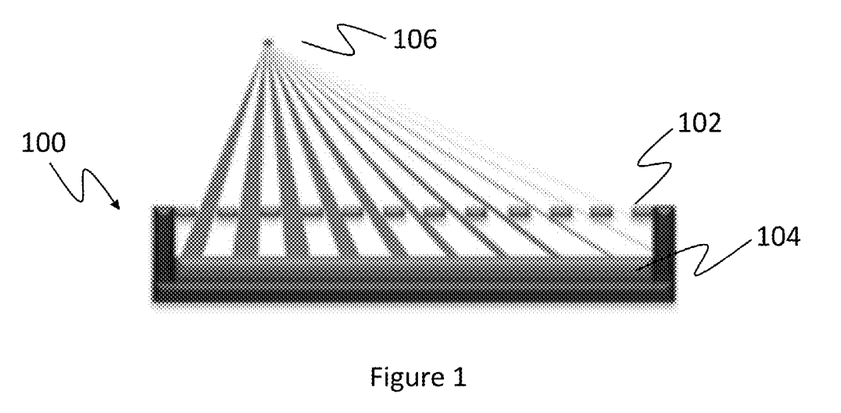
FIG. 1 illustrates a target and sensor as described herein.

As further illustrated in FIG. 1, the shadow sensor 100 comprises an imager 104 and a mask 102. The mask 102 is composed of repetitive patterns and of a distinctive element, for example, a form of a grating. In this way, as light from a light source 106 passes through the mask 102, a distinct shadow pattern is cast on the imager 104 behind the mask 102 in accordance with the position of the sensor 100 with respect to the light source 106 and the pattern of the mask 102. By using a repetitive pattern for the mask 102, the precision of the sensor 100 may be increased by improving the measurement of the sensed pattern. By recording the shadow of the mask 102 cast by each light source 106 on the imager 104, and by properly multiplexing the LEDs, the system can compute the 6D position of the target with respect to the shadow sensor.

Figure 2:
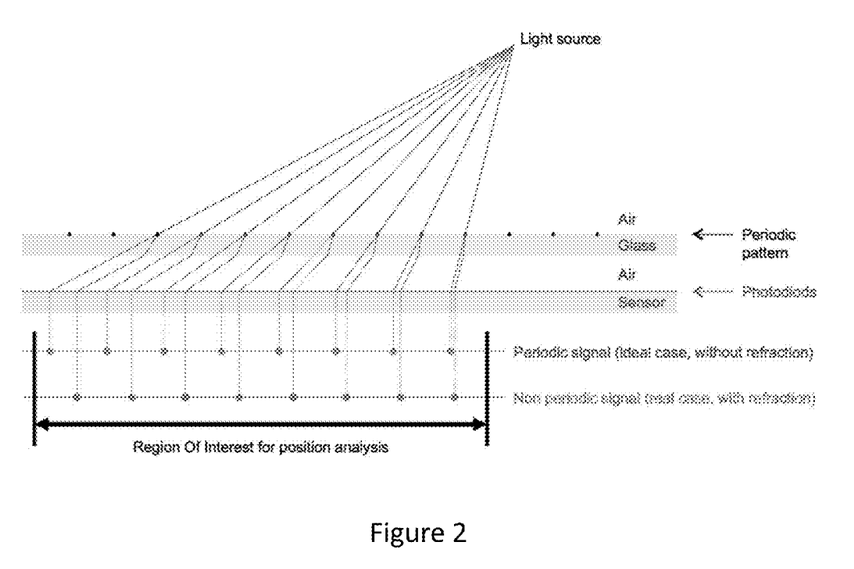
FIG. 2 illustrates Snell's law as applied to a sensor described herein.

For example, the repetitive pattern of the mask 102 may be a checkerboard engraved on piece of glass. In other embodiments, the mask 102 could be a set of microlenses. In practice, if looked at in a small scale, a regular mask does not generate a strictly regular shadow. This is because the mask 102 has a certain thickness (as can be seen in FIG. 1), because of refraction effects on the glass of the mask 102, and/or because of other optical phenomena. The refraction phenomenon transforms a perfectly regular shadow mask into an irregular shadow. This is due to a layer of glass which is traversed by the light prior to reading by the imager 104. By assuming a light position, and applying Snell's law, the shape of the shadow may be computed, as is illustrated in FIG. 2. This shape can be used to compute the shadow position in an iterative process, by starting with an estimate of the position, computing the shadow, slightly changing the position estimate in two opposite directions, and recomputing the shadow for each position change. By correlating the real shadow with these three shadow estimates, the real shadow position can be interpolated.

It is to be understood that any pattern may be used that can cast a shadow of approximately regular alternations of shadow and light. In this way, in the first steps of a computation, a regular pattern can be assumed and an efficient and accurate algorithm to compute a position estimate can be applied.

In one embodiment of the described shadow sensor 100, the imager 104 size may be on the order of a few millimeters, a mask 102 to imager 104 distance may be on the order of about 0.3 to two millimeters, and the distance between two repetitive patterns on the mask 102 may be on the order of about 100 microns. Thus, a full shadow sensor 100 may be about 10×10×2 millimeters, including various processors and other components, but excluding a battery. In other embodiments, the shadow sensor 100 may be about 4×4×1 millimeters. However, it should be noted that these dimensions are not intended to be limiting and even smaller shadow sensors are envisioned to be within the scope of the present disclosure.

To record the projection of light sources, a shadow sensor 100 may sense several different wavelengths, use a temporal multiplexing scheme, or a combination of sensing several wavelengths and a temporal multiplexing scheme. Regarding the sensing of several wavelengths, as described in the '455 Application, a shadow sensor 100 can simultaneously record the projection of several light sources by using light sources with distinct spectra, and dividing the sensor 100 into zones with distinct frequency responses. The zones can be large zones covering several periods of the mask 102, or small zones, for example, using a filter having the size of a single pixel. In the latter case, the filters are placed on the pixels of the imager 102, whereas in the former case, the filter can be placed either near the mask 102, near the imager 104, or anywhere in-between. The filters do not need to be perfectly matched to the light source spectra; rather, it suffices that the influence of each LED for each filtered response can be recovered. In other words, if a squared matrix of responses, where each line represents the response to each light source and each column represents the response for each filter, is invertible, then it is possible to distinguish the influence of each LED. To ensure a good resilience to noise, this matrix has, in some embodiments, a condition number below 100, and in other embodiments, below 10. The signal to noise ratio can be further enhanced by having light sources with sharp spectral emissions, and filters with sharp spectral responses at the same frequency as the light source.

Temporal multiplexing allows handling more light sources with simpler and less expensive hardware, particularly where the target does not move fast (e.g., having a displacement larger than 10% of the desired (x,y,z) precision). However, temporal multiplexing may be less capable depending on the motion of the LEDs in-between the shadow acquisition. The 6D computation is based on the target being a rigid body, which means that the relative positions of the target LEDs are fixed. Thus, a target that moves between each LED shadow acquisition is equivalent to a target where the LED can have a relative and unknown displacement, thereby resulting in a poor 6D position computation.

To solve the motion issues, acquisition is performed as fast as possible. In addition, by temporally tracking the position of each LED individually, and knowing when the measurement took place, the position of each LED over time can be interpolated. Thus, using these interpolated values, the 6D position of the target may be computed by taking the position of each LED at a given time. The position of the LED is interpolated in 3D space when using a double shadow sensor, or in 2D projection space when using a single shadow sensor. The simplest interpolation model assumes that the light source travels at constant speed. More elaborate models use a constant acceleration, or a continuous acceleration assumption (without jumps), and can use a Kalman filter to track the speed and acceleration of each light source over time.

In the temporal multiplexing scheme, the projection corresponding to each light source should be known. Thus, in one embodiment, a radiofrequency link can be used to send an ID of the light source and to sync the light emission with the recording of the shadow. To avoid using radio frequency, other embodiments may use an additional photodiode which is sampled at higher temporal frequency than the recording of the shadow (for example at 10 times higher temporal frequency). If a filter is used in a shadow sensor, then the photodiode may be placed behind the filter of the shadow sensor, next to the imager. This additional photodiode serves two purposes: it is used to sync the recording of the shadow with the light emission and is used to identify which LED is emitting light. This can be done, for example, by varying the emission delay in-between the LEDs, such that by measuring the time interval between two or more light emissions, it is possible to determine when each LED is emitting light. Therefore, it is also possible to determine the projection corresponding to each LED. One advantage to using an additional photodiode instead of a radio frequency link is that the additional photodiode is more cost effective. For example, the target can be a very simple device with LEDs that are pulsed according to a predetermined temporal scheme, with no feedback from the shadow sensor.

Alternatively, a shadow sensor in the temporal multiplexing scheme could be used without the additional photodiode. In such embodiments, the shadow sensor effectively operates as a single photodiode by taking an image with the shadow sensor and summing the captured pixels to generate a single value. The single value is proportional to the value that would have been obtained using the additional photodiode. Therefore, the same method described above with respect to the photodiode may be used with the single value generated by the shadow sensor.

Figure 3:
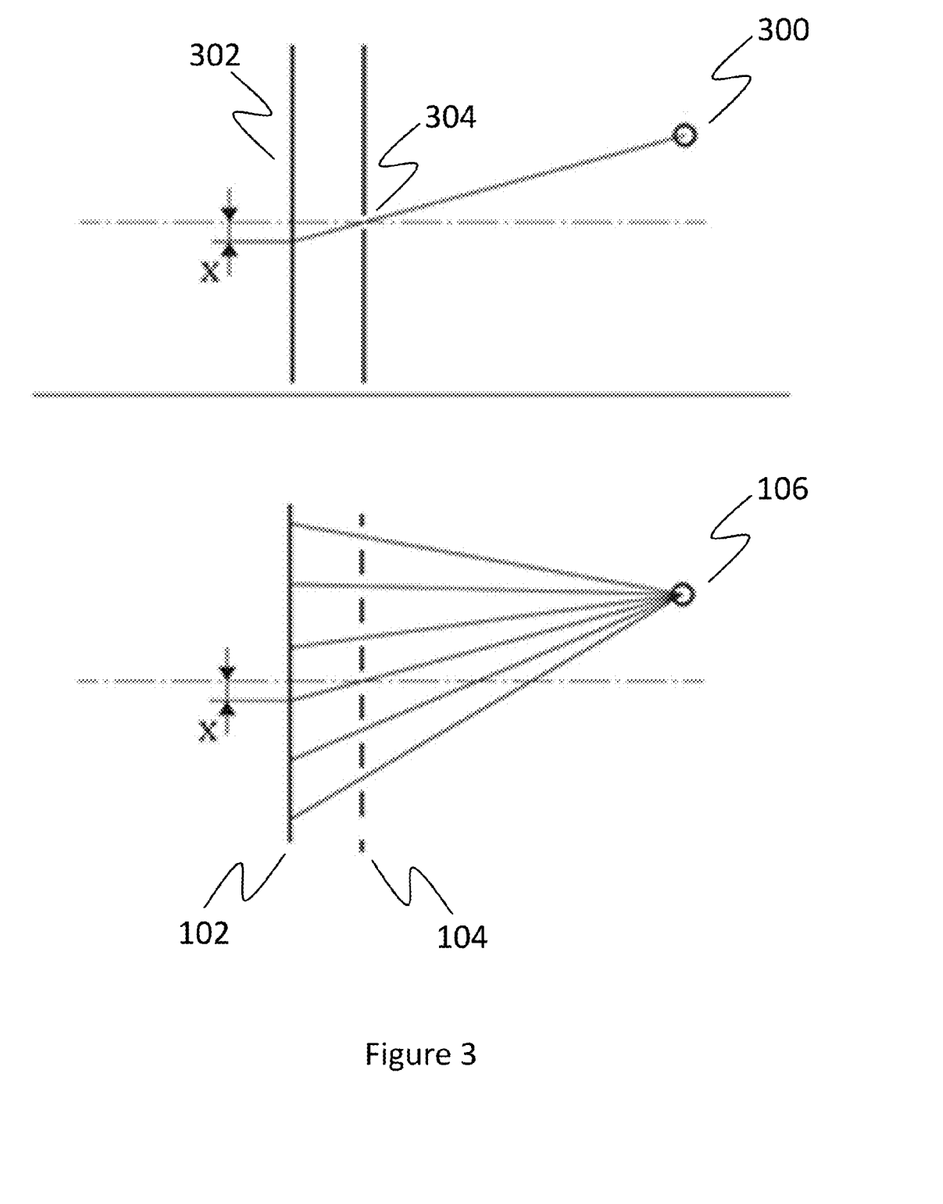
FIG. 3 illustrates the equivalence between a pinhole camera and a sensor described herein.

To determine the position of a sensor as described herein with respect to a light source using geometric computations, the shadow sensor can be considered as a pinhole camera. With such a model, a shadow position computation result can be related to the equivalent of the coordinate of the projection of the light source. FIG. 3 illustrates this equivalence between a pinhole camera and a shadow sensor 100, where the top panel of FIG. 3 illustrates the mechanism of a regular pinhole camera while the bottom panel illustrates the equivalent mechanism applied to a shadow sensor 100. As shown in FIG. 3, the position x is computed from the shadow generated on the imager 102 by light from a light source 106 passing through the mask 104 in the same manner as the projection of an object point 300 on an image plane 302 as light from the object point passes through a pinhole 304 of a pin-hole camera. It is to be understood that the position x is two dimensional, but is illustrated in a single dimension in FIG. 3 for clarity. The pinhole equivalent focal length of the shadow sensor is the distance between the mask and the imager. Thus, a sensor with known pixel size and configuration, and know sensor-to-mask distance can be considered as a calibrated pinhole camera. Once this equivalence between the shadow sensor 100 and a pinhole camera is understood, projective geometry can be applied to compute the position of the shadow sensor 100 with respect to a set of points (e.g., a target or light source 106) in space, provided the position of the set of points in space is known or has been estimated. This pinhole model can be applied to light projections at a computed position and compared with the sensed projections.

In the shadow sensor 100, the Z distance from the mask 102 to the light source 106 (measured along the optical axis) can be obtained by computing the scale of the shadow of the mask 102. For example, if the shadow is of the same scale as the mask 102, the light source 106 is very far away, if the shadow is larger than the light source 106 is close to the mask 102. By computing the enlargement ratio, said Z distance may be determined. In practice, however, this measurement is not very well conditioned, and may result in a measurement with poor precision. Thus, the estimation of position x may about 100 times more precise than the estimation of distance Z.

Because of the poor performance in Z estimation, in one embodiment, an estimation of the position of the shadow sensor using only the 2D position (x) estimation for each light source may be determined. To compute the 6D position of the sensor with respect to known positions of light sources, the projection of four light sources is desired. Linear techniques for computing the 6D position are efficient, but are not optimal result in terms of accuracy. In contrast, non-linear techniques deliver better accuracy but are iterative and, therefore, need an initial position estimate. For these iterative techniques, the initial position estimate can be given by the linear technique or by a tracking process over time.

For example, the computation of the 6D position of a plane in space using four or more correspondences ($\{x_i \leftrightarrow x_i'\}$, as derived from the above-mentioned points) can be determined according to multiple view geometry principles. This computation can be applied to a scenario where the light sources are all on the same plane. To do so, first the 2D homography matrix between the sensor plane and the light source plane is computed, such that $x_i'=Hx_i$, where H represents a 2D homography matrix. Then, the first two columns of the rotation matrix and the translation vector can be retrieved according to the relationship $H=K [r_1, r_2, t]$, where K are internal parameters, $r_1$ and $r_2$ represent the first two columns of the rotation matrix, respectively and t represents the translation vector. From this information, the full 6D transformation from the sensor plane to the light source plane (provided the world origin is located on the sensor) may be obtained using the focal length of the shadow imaging system which defined the 6D position in space of the target.

Figure 4:
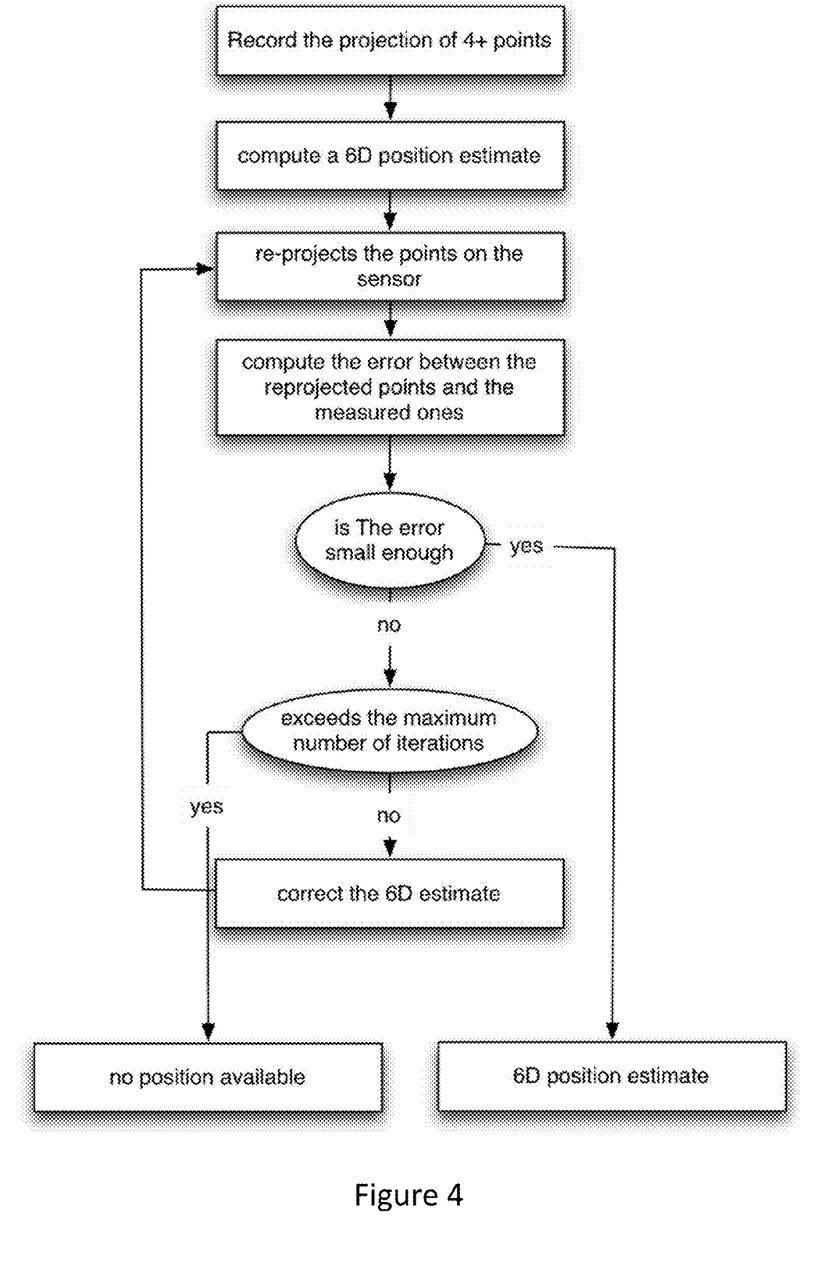
FIG. 4 illustrates a flow chart for computing the 6D position of a sensor described herein with respect to a target.

FIG. 4 illustrates a flow chart of the 6D position computation. A computing system, for example a computing system controlled by a processor, starts by recording the projection of four or more points (e.g., light sources). The number of "points", as the term is used herein, can generally be understood as the sum of the number of light sources and number of sensors in the system—for example, a system with four light sources and one sensor has four points; and a system with three light sources and two sensors has six points. In other words, the projection of a light source on a sensor can be understood to be a "point". Then, the system computes a first estimate of the 6D position, either using past information (tracking) or using any suitable computation method, for example the linear method described above. From the 6D estimate, the system virtually reprojects the points on the sensor, using the pinhole model. An error value is computed by comparing the reprojected 2D position of every light source with the 2D position computed using the shadow. In some embodiments, the error value may be computed using an error metric such as a weighted L1 norm, but any suitable error metric could be used. Since the problem is over-constrained, the error is not null. Thus, an iterative error minimization can be performed in order to improve the 6D position estimate. To compute the L1 weighted error norm, the weight can be set using the contrast of the shadow. In other words, the more contrasted the shadow, the more confidence in the measurement and the higher the weight. It should also be noted that when there is a-priori knowledge on the target position or when the point coordinate (x,y) is not the only information retrieved from each light source, it is possible to use fewer than four points to compute the 6D position. Such embodiments with respect to three points are discussed in more detail below.

In the iterative process, the estimate of the shadow position from the shadow signal can be updated as well so as to better correspond to the pin-hole model. For example, by having an estimate of a light source's 3D location, the assumed shape of the shadow can be computed by accounting for scaling and/or refraction. A shifted version of this assumed shape can be used to estimate the shadow position.

Using the above described shadow sensor for computing 6D positions results in more precise measurements than the identification of a target point/object in a scene by a conventional camera. For example, the position of the shadow sensor can be computed with a precision of the order of 1 nanometer or less, whereas the location of a target seen by a high resolution camera is roughly on the order of 100 microns. Further, once the light source configuration is setup, there can be an arbitrary number of shadow sensors in the scene.

The shadow computation works in principle as described in equation 2 of the '455 Application, reproduced herein:

$$\begin{cases} A = \sum_x \sin\left[\frac{2\pi}{\Delta P} M \cdot x\right] \cdot s(x) \\ B = \sum_x \cos\left[\frac{2\pi}{\Delta P} M \cdot x\right] \cdot s(x) \\ dX = -\operatorname{atan2}(A, B) \cdot \Delta P \end{cases}$$

where M is the pixel pitch, s(x) is the shadow pattern, x is the pixel coordinate, and a tan 2(A,B) is the arctan(A/B) function defined in $[-\pi, \pi]$. In sum, the above equation uses the shadow image to take the sum over the lines and the sum over the columns, resulting in two signals. One signal is used to estimate the x coordinate, the other to estimate the y coordinate.

To take advantage of the repetition of the pattern present in the mask, the computation assumes that the shadow has a given shape, and correlates the measured shape with shifted versions of the assumed shape. The dot product could also be used instead of a correlation. However, it should be noted that the same measurement should be used throughout the computation. In the '455 Application, the assumed shape is a sinusoid and two versions of the assumed shadow shape shifted by half the shape period are used. The ratio of the two dot products is taken, which follows an arctan law, to retrieve the position.

More generally, when starting with a position estimate, a three shifted version of the assumed shape can be used, making sure that among the versions, the first is shifted too far on one end and the last is shifted too far in the other end. Then, a correlation (or dot product, or any similarity measure) value for each can be calculated and a parabola can be fit to the three values. The position of the parabola extremum gives the position estimate of the shadow. In other words, it can be assumed that the similarity measure can be well approximated by a quadratic rule with the shift.

When using a more complex optical model, for example by taking into account the refraction phenomenon described above, the shifting of the shadow assumed shape is computed by virtually shifting the light sources and computing the resulting shadow according to the refraction model.

To measure the actual shape of the mask 102, a shadow recording can be taken by exposing the shadow sensor 100 to a collimated light source where the rays of the collimated light source are parallel to the optical axis of the sensor 100. This shape can then be used to compute the shape of the shadow by assuming a 3D position of the light source in the context of an iterative position computation process.

While the above described procedure gives the position up to an undetermined multiple of the signal period, the absolute shadow location can be computed by using a distinctive element, as described in the '455 Application. For example, the distinctive element can be a 2D code interlaced with the repetitive patterns.

As mentioned above, the target comprises at least one light source, but may comprise additional light sources in various arrangements. For example, in one embodiment, the 6D position of a shadow sensor can be computed using only three light source projections. These three projection locations lead to the resolution of a quadratic system of equations that has four solutions. The derivation of the solutions to such a system are described, for example, in "Review and Analysis of Solutions of the Three Point Perspective Pose Estimation Problem" by Haralick et al., *International Journal of Computer Vision* 13, no. 3 (1994): 331-56, which is herein incorporated by reference in its entirety.

Such an embodiment may be possible when a good initial estimate of the position is known, for example, when the shadow sensor is tracked over time and one of the LED is temporarily out of sight. In another example, such an embodiment may be possible when using the Z estimate for each light source, and selecting the 6D position out of the four solution candidates which leads to a Z position of each light source that is the closest to the corresponding Z estimate. The closest, as used herein, refers to when the sum of the differences between the Z positions and the Z estimates using any suitable metric is minimum. In this scenario, by knowing the precision of the Z estimations, it can be determined whether the 6D position is correct or if two solutions may be confused. Yet another example is when only one solution out of the four is possible, thanks to an a-priori knowledge of the target position. There might be cases where, for mechanical reasons, the target is not allowed to move toward the other solutions, and there is no indeterminate position. The Z value of each light source can be estimated by comparing the size of the mask to the size of the shadow of the mask. Using basic geometric consideration, when Z is big, these sizes tend to be equal, and when Z is small, the shadow of the mask is bigger than the mask itself.

In another embodiment, the 6D position of a shadow sensor can be computed using only three light source projections and the Z estimate for each light source. From the light projection and the Z estimate, one can derive the three dimensional (3D) position of each light source in space. From these 3D positions, one can fit the 3D model of the target to the estimated 3D positions of the light sources to get the 6D position of the target. In this fitting process, one may preferably put more emphasis in fitting well the (x,y) projection of the light source location than in fitting well the Z value, since the latter has a lower precision.

In other embodiments, three light sources may be used with two shadow sensors configured as a stereo shadow sensor. A stereo shadow sensor, as used herein, refers to two shadow sensors whose relative position is known. In such embodiments, each sensor can record a projection of the light sources, resulting in an $(x_1,y_1,x_2,y_2)$ estimate of the shadow positions on the first and second sensors, respectively. From this data, the Z estimate may be retrieved with good precision, provided that the distance between the two shadow sensors is well controlled and large enough. From this information, one can recompute the (X,Y,Z) coordinate in world coordinate of the light source, and thus the 6D coordinate of the target. Optimization of the 6D position estimate can be performed by minimizing the reprojection error between the measured $(x_1,y_1,x_2,y_2)$ versus the computed $(x_{1C},y_{1C},x_{2C},y_{2C})$ from the 6D position estimate, in a similar way as in a four light source scenario.

Figure 5:
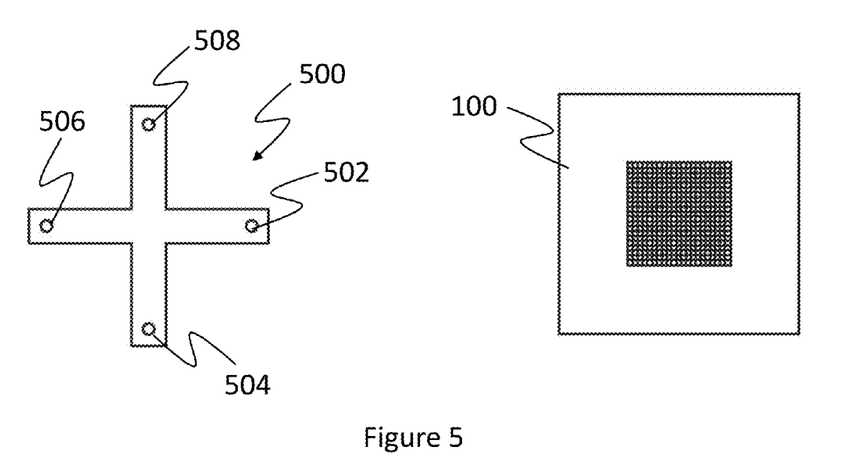
FIG. 5 illustrates a target with four coplanar light sources, and a shadow sensor as seen from a point on the optical axis.
Figure 6:
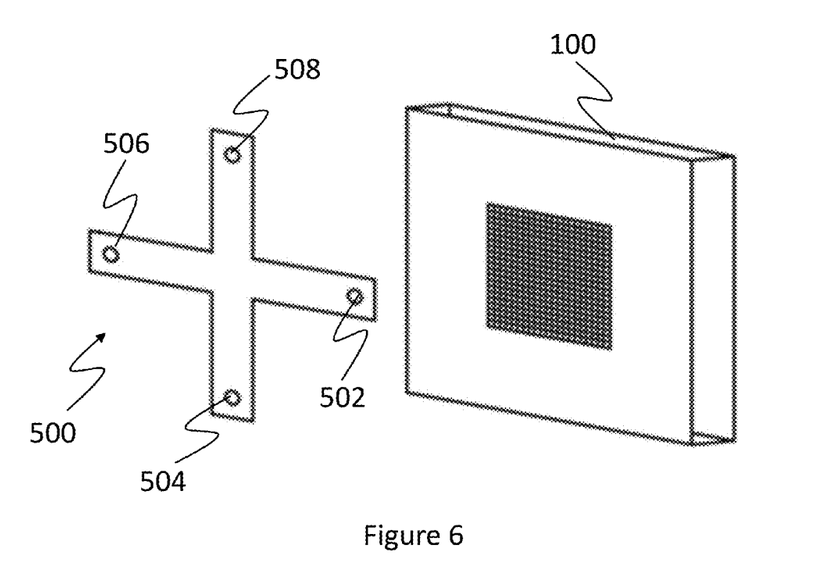
FIG. 6 illustrates a perspective view of a target with four coplanar light sources and a shadow sensor.

According to other embodiments of the target, four or more LEDs may be used. In such embodiments, the four LEDs may be configured on a single plane, as illustrated in FIGS. 5 and 6. FIG. 5 illustrates a target 500 with four coplanar light sources 502-508, and a shadow sensor 100 as each is seen from a point on the optical axis, and FIG. 6 illustrates a perspective view of the target 500 with four coplanar light sources 502-508, and a shadow sensor 100. The LEDs may also be pulsed to generate the shadow on the sensor. One advantage of a planar configuration is the generation of a large angular span without any occlusions. Another advantage is reduced production costs. Still another advantage is that a simple linear method may be used to compute the first position estimate, for example, the linear method described above for determining the 6D position from the projection of four coplanar points. In these configurations, the target could be turned by +/−90 degrees, along two directions crossing the optical axis of the shadow sensor, and the shadow sensor would still be able to record four positions. However, more practically, the angular span may be about +/−70 degrees due to non-uniform angular spreads of the light from the point light sources. Again, it is to be understood that other configurations, including those that are not planar, may be used are envisioned to be within the scope of the present disclosure.

Figure 7:
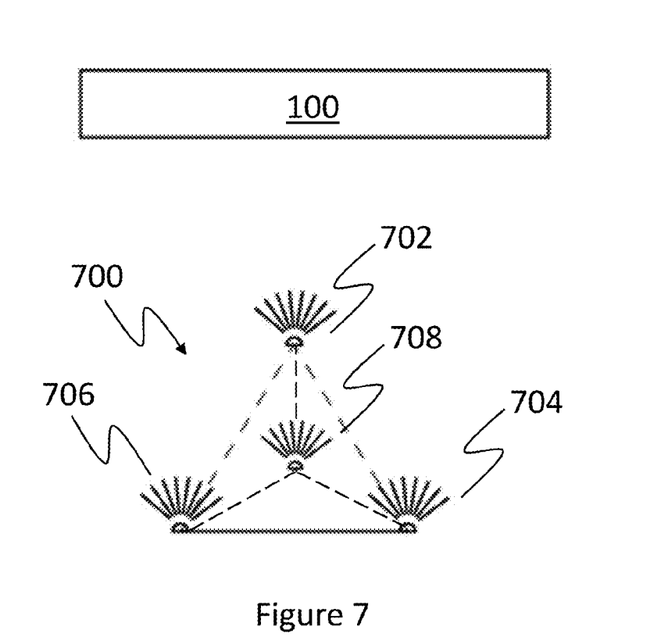
FIG. 7 illustrates a sensor and a target configuration corresponding to a regular tetrahedron.
Figure 8:
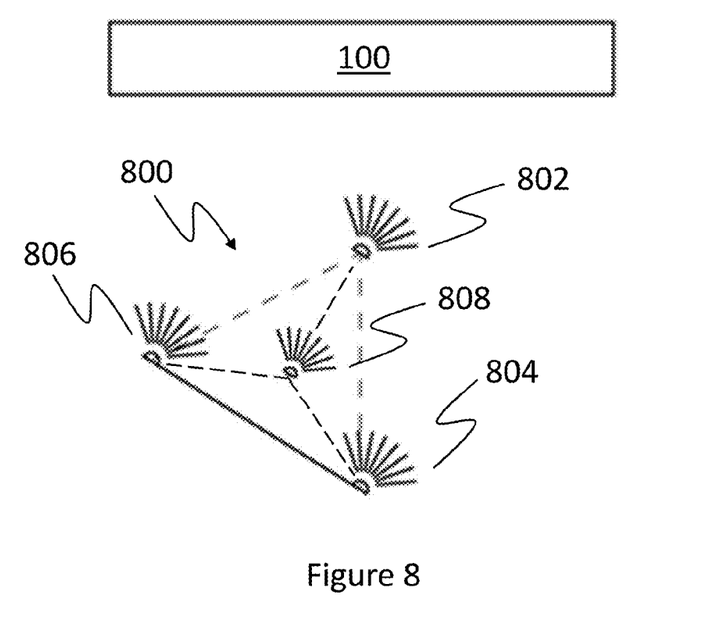
FIG. 8 illustrates a sensor and a target configuration corresponding to a regular tetrahedron, where one of the light sources of the target is occluded as seen by the sensor.
Figure 9:
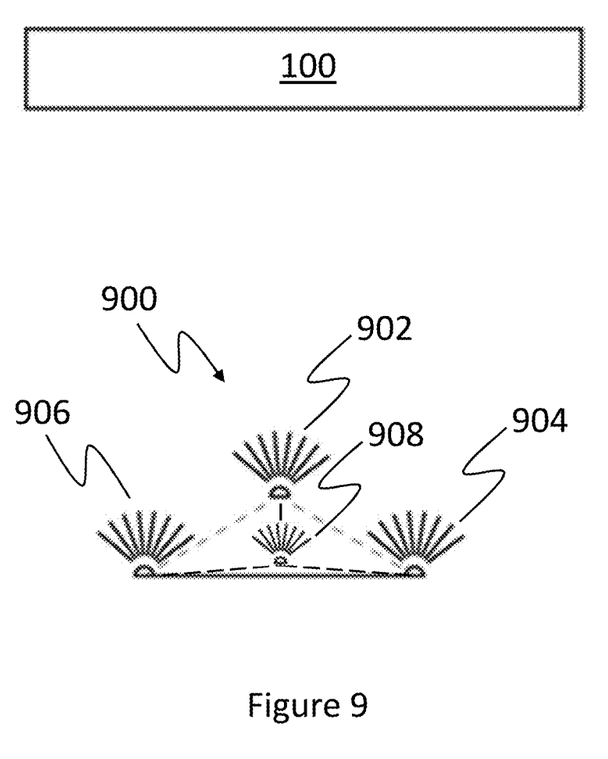
FIG. 9 illustrates a sensor and a target configuration corresponding to a flattened tetrahedron.

In yet another configuration, three coplanar light sources are used in addition to one off-plane light source. For example, such a configuration would correspond to a regular tetrahedron, where the light sources are placed on the four corners of the tetrahedron. Such a target configuration 700 is illustrated in FIG. 7 with shadow sensor 100. Such a configuration may produce better angular accuracy than the planar configuration because rotation of the shadow sensor will induce a larger shadow displacement compared to using a planar target of similar size. However, the angular span may be limited to about +/−35 degrees in some directions and, when two light sources are aligned with the optical axis, one of the light sources may be occluded. FIG. 8 illustrates this occlusion with a target configuration 800, where light source 804 is occluded by light source 802 as seen by shadow sensor 100. Therefore, a compromise between a regular (or high) tetrahedral LED configuration, as illustrated in FIGS. 7 and 8, and a flatter target configuration 900, as illustrated in FIG. 9, may be used in some embodiments. In such an embodiment, the closer an off-planar light source 902 is to the coplanar light sources 904-908 the larger the angular span and the worse the angular positioning accuracy. However, having the off-planar light source 902 in a lower position (closer to the coplanar light sources 904, 906), the more the target and/or sensor 100 must rotate in order to align two light sources with the optical axis resulting in an occlusion.

It is noted that while the above configurations of a target are described, other configurations are envisioned to be within the scope of the present disclosure.

It is also to be noted that any of the aspects, or combination of aspects, described above may be implemented via hardware or software. For example, these aspects may be implemented on a processor or a plurality of processors, within or external to the shadow sensor. These processors also may be embedded or integrated with other processors designed for a separate purpose, for example, as part of a central processing unit (CPU). A "processor" as used herein refers to any, or part of any, electrical circuit comprised of any number of electrical components, including, for example, resistors, transistors, capacitors, inductors, and the like. The circuit may be of any form, including, for example, an integrated circuit, a set of integrated circuits, a microcontroller, a microprocessor, a collection of discrete electronic components on a printed circuit board (PCB) or the like. The processor may also stand alone or be part of a computer used for operations other than processing sensed data. Implementation of these aspects may by hardware or software and may be realized in any number of electronic devices and/or applications, including but not limited to, personal computers, servers, mobile phones, and the like. Moreover, the above aspects and/or combination of aspects may be stored in memory which is executable by one of said processors. It should be noted that the above description is non-limiting, and the examples are but only a few of many possible processors and implementations envisioned.

While various features are presented above, it should be understood that the features may be used singly or in any combination thereof. Further, it should be understood that variations and modifications may occur to those skilled in the art to which the claimed examples pertain. The examples described herein are exemplary. The disclosure may enable those skilled in the art to make and use alternative designs having alternative elements that likewise correspond to the elements recited in the claims. The intended scope may thus include other examples that do not differ or that insubstantially differ from the literal language of the claims. The scope of the disclosure is accordingly defined as set forth in the appended claims.

What is claimed is:

1. A six dimensional (6D) positioning system comprising:
   a target comprising at least four light sources;
   a shadow sensor configured to sense shadows cast on the sensor by light emitted from the at least four light sources of the target; and
   a processor,
   wherein the processor is configured to:
     sync shadow sensing with a pulsing of the at least four light sources of the target;
     distinguish between the sensed shadows from each of the at least four light sources of the target;
     determine two dimensional (2D) positions corresponding to each of the at least four light sources of the target based on the sensed shadows; and
     compute a 6D position of the target with respect to the shadow sensor based on the determined 2D positions.

2. The 6D positioning system according to claim 1, wherein the shadow sensor comprises a mask and an imager, the mask having repetitive elements and a distinctive element, and wherein as light from the at least four light sources of the target passes through the mask, a shadow of the mask is cast on the imager.

3. The 6D positioning system according to claim 1, wherein the shadow sensor comprises a plurality of filters for filtering light of a plurality of wavelengths, and the processor is configured to distinguish between the sensed light from each of the at least four light sources based at least in part on the sensed wavelengths of light.

4. The 6D positioning system according to claim 1, wherein the processor is configured to distinguish between the sensed light from each of the at least four light sources based at least in part on temporal modulation of the at least four light sources of the target.

5. The 6D positioning system according to claim 4, wherein the shadow sensor comprises a filter for filtering wavelengths of ambient light.

6. The 6D positioning system according to claim 2, wherein the shadow sensor further comprises a photodiode for syncing shadow sensing with the pulsing of the at least four light sources of the target or for identifying which light source is emitting light.

7. The 6D positioning system according to claim 1, wherein the 6D position of the target with respect to the shadow sensor is computed based on a pinhole model of light projection.

8. A six dimensional (6D) positioning system comprising:
   a target comprising at least three light sources;
   at least two shadow sensors configured to sense shadows cast on the at least two shadow sensor sensors by light emitted from the at least three light sources of the target; and
   a processor,
   wherein the processor is configured to:
     sync shadow sensing of the at least two shadow sensors with a pulsing of the at least three light sources of the target;
     distinguish between the sensed shadows from each of the at least three light sources of the target, for each of the at least two shadow sensors;
     determine two dimensional (2D) positions corresponding to each of the at least three light sources of the target based on the sensed shadows, for each of the at least two shadow sensors; and
     compute a 6D position of the target with respect to the at least two shadow sensors based on the determined 2D positions.

9. The 6D positioning system according to claim 8, wherein the shadow sensor comprises a mask and an imager, the mask having repetitive elements, a distinctive element, or a 2D code, and wherein as light from the at least three light sources of the target passes through the mask, a shadow of the mask is cast on the imager.

10. The 6D positioning system according to claim 8, wherein the shadow sensor comprises a plurality of filters for filtering light of a plurality of wavelengths, and the processor is configured to distinguish between the sensed light from each of the at least three light sources based at least in part on the sensed wavelengths of light.

11. The 6D positioning system according to claim 8, wherein the processor is configured to distinguish between the sensed light from each of the at least three light sources based at least in part on temporal modulation of the at least three light sources of the target.

12. The 6D positioning system according to claim 11, wherein the shadow sensor comprises a filter for filtering wavelengths of ambient light.

13. The 6D positioning system according to claim 9, wherein the shadow sensor further comprises a photodiode for syncing shadow sensing of the at least two shadow sensors with the pulsing of the at least three light sources of the target or for identifying which light source is emitting light.

14. The 6D positioning system according to claim 8, wherein the 6D position of the target with respect to the at least two shadow sensors is computed based on a pinhole model of light projection.

15. A method for determining a six dimensional (6D) position comprising:
  recording a projection of at least four points, a projection of a point being a projection of light from a light source on a sensor, wherein the light source and the sensor are part of a positioning system;
  computing a first estimate of the 6D position using known prior positions or a linear method;
  virtually reprojecting the at least four points on the sensor using a pinhole model of light projection; and
  computing an error between the recorded projections and the virtual reprojections.

16. The 6D positioning method according to claim 15, wherein the method the steps of computing an estimate, virtually reprojecting the at least four points, and computing an error are performed iteratively.

17. The 6D positioning method according to claim 15, wherein the positioning system comprises two sensors and three light sources, the light sources being light emitting diodes (LEDs).

18. The 6D positioning method according to claim 15, wherein the positioning system comprises one sensor and four light sources, the light sources being light emitting diodes (LEDs).

19. The 6D positioning method according to claim 15, wherein the sensor is a shadow sensor comprising a mask and an imager, the mask having repetitive elements, a distinctive element, or a 2D code, and wherein as light from the light source passes through the mask, a shadow of the mask is cast on the imager.

20. The 6D positioning system according to claim 19, wherein the shadow sensor further comprises a photodiode for syncing the recording of the projection of the at least four points with an emission of light from the light source or for identifying which light source is emitting light.

21. A six dimensional (6D) positioning system comprising:
  a target comprising three light sources;
  a shadow sensor configured to sense shadows cast on the sensor by light emitted from the three light sources of the target; and
  a processor,
  wherein the processor is configured to:
    sync shadow sensing with a pulsing of the three light sources of the target;
    distinguish between the sensed shadows from each of the three light sources of the target;
    determine two dimensional (2D) positions corresponding to each of the three light sources of the target based on the sensed shadows;
    determine a Z value for each of the three light sources, the Z value corresponding to a distance from said light source for which the Z value is determined to the shadow sensor as measured along the optical axis of said shadow sensor; and
    compute a 6D position of the target with respect to the shadow sensor based on the determined 2D positions and on the determined Z values.

22. The 6D positioning system according to claim 21, wherein the processor is configured to:
  compute four 6D positions of the target with respect to the shadow sensor based on the determined 2D positions; and
  select a 6D position among said four 6D positions, the selected 6D position having the most correspondence to said determined Z values.

* * * * *

UNITED STATES PATENT AND TRADEMARK OFFICE
CERTIFICATE OF CORRECTION

PATENT NO. : 9,696,185 B2
APPLICATION NO. : 14/597434
DATED : July 4, 2017
INVENTOR(S) : Hasler

Page 1 of 1

It is certified that error appears in the above-identified patent and that said Letters Patent is hereby corrected as shown below:

On the Title Page

Item (73), please update the Assignee: from "CSM CENTRE SUISSE D'ELECTRONIQUE ET DE MICROTECHNIQUE SA-RECHERCHE ET DEVELOPPEMENT," to -- CSEM CENTRE SUISSE D'ELECTRONIQUE ET DE MICROTECHNIQUE SA-RECHERCHE ET DEVELOPPEMENT, --

Signed and Sealed this
Thirty-first Day of October, 2017

Joseph Matal
*Performing the Functions and Duties of the*
*Under Secretary of Commerce for Intellectual Property and*
*Director of the United States Patent and Trademark Office*